US012229931B2

(12) United States Patent
Morzos

(10) Patent No.: US 12,229,931 B2
(45) Date of Patent: *Feb. 18, 2025

(54) SYSTEMS AND METHODS FOR COMPRESSION ARTIFACT DETECTION AND REMEDIATION

(71) Applicant: DISH Network L.L.C., Englewood, CO (US)

(72) Inventor: Adam Morzos, Franktown, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,853

(22) Filed: Oct. 30, 2023

(65) Prior Publication Data

US 2024/0112317 A1    Apr. 4, 2024

Related U.S. Application Data

(63) Continuation of application No. 18/055,786, filed on Nov. 15, 2022, now Pat. No. 11,810,283, which is a continuation of application No. 17/095,678, filed on Nov. 11, 2020, now Pat. No. 11,508,053.

(51) Int. Cl.
  *G06K 9/00* (2022.01)
  *G06T 7/00* (2017.01)

(52) U.S. Cl.
  CPC .. *G06T 7/0002* (2013.01); *G06T 2207/20081* (2013.01); *G06T 2207/30168* (2013.01)

(58) Field of Classification Search
  CPC ......... G06T 7/0002; G06T 2207/20081; G06T 2207/30168

USPC ........................................................ 382/100
See application file for complete search history.

(56) References Cited

U.S. PATENT DOCUMENTS

| 2016/0098822 A1 | 4/2016 | Nicolas |
| 2020/0175652 A1 | 6/2020 | Agarwal et al. |
| 2022/0148146 A1 | 5/2022 | Morzos |

(Continued)

OTHER PUBLICATIONS

Goodall, Todd R., and Alan C. Bovik. "Detecting and mapping video impairments." IEEE Transactions on Image Processing 28.6 (2018): 2680-2691. (Year: 2018).

(Continued)

*Primary Examiner* — Jonathan S Lee
(74) *Attorney, Agent, or Firm* — Perkins Coie LLP

(57) ABSTRACT

Examples of the present disclosure describe systems and methods for detecting and remediating compression artifacts in multimedia items. In example aspects, a machine learning model is trained on a dataset related to compression artifacts and non-compression artifacts. Input data may then be collected by a data collection module and provided to a pattern recognition module. The pattern recognition module may extract visual and audio features of the multimedia item and provide the extracted features to the trained machine learning model. The trained machine learning model may compare the extracted features to the model, and a confidence value may be generated. The confidence value may be compared to a confidence value threshold. If the confidence value is equal to or exceeds the confidence threshold, then the input data may be classified as containing at least one compression artifact. Remedial action may subsequently be applied (e.g., boosting the system with technical resources).

20 Claims, 7 Drawing Sheets

(56) References Cited

U.S. PATENT DOCUMENTS

2023/0076776 A1    3/2023   Morzos

OTHER PUBLICATIONS

Obiyemi, O. O., et al. "Quantification of Rain Induced Artifacts on Digital Satellite Television Reception." Nigerian Journal of Technology 34.4 (2015): 802-808. (Year: 2015).

Segall, C. Andrew, and Aggelos K. Katsaggelos. "Pre-and post-processing algorithms for compressed video enhancement." Conference Record of the Thirty-Fourth Asilomar Conference on Signals, Systems and Computers (Cat. No. 00CH37154). vol. 2. IEEE, 2000. (Year: 2000).

Mu, Mu, et al. "Quality Evaluation in Peer-to-Peer IPTV Services." Data Traffic Monitoring and Analysis. Springer, Berlin, Heidelberg, 2013. 302-319. (Year: 2013).

Yu, Zhenghua, et al. "Vision-model-based impairment metric to evaluate blocking artifacts in digital video." Proceedings of the IEEE 90.1 (2002): 154-169. (Year: 2002).

SYSTEMS AND METHODS FOR COMPRESSION ARTIFACT DETECTION AND REMEDIATION

CROSS-REFERENCE TO RELATED APPLICATION

This application is a continuation of U.S. patent application Ser. No. 18/055,786, filed Nov. 15, 2022, entitled "SYSTEMS AND METHODS FOR COMPRESSION ARTIFACT DETECTION AND REMEDIATION," which is a continuation of U.S. patent application Ser. No. 17/095,678, filed on Nov. 11, 2020, entitled "SYSTEMS AND METHODS FOR COMPRESSION ARTIFACT DETECTION AND REMEDIATION," now U.S. Pat. No. 11,508,053, issued on Nov. 22, 2022, which is incorporated herein by reference in its entirety.

TECHNICAL FIELD

The present disclosure relates to the fields of compression artifacts (or artefacts), artificial intelligence, and machine learning.

BACKGROUND

Compression artifacts (also spelled "artefacts") are noticeable distortions in media items, such as distortions in images, audio, and video streams. Compression artifacts are caused by application of lossy compression, which involves discarding some of the media item's data so that the media item becomes small enough to be stored within a desired memory space and/or, e.g., streamed over a network within an available bandwidth (i.e., to comply with data rate and bit rate constraints), while simultaneously maintaining enough detail to accurately represent the content of the media item. If the compressor cannot store enough data in the compressed version of the media item, the result is a loss of quality in the media item, which usually results in the introduction of compression artifacts into the media item. For example, an image or frame in a video stream may display compression artifacts in the form of "fuzziness" or loss of edge clarity around a certain object.

Presently, media companies and organizations struggle with maintaining quality of the media item while simultaneously compressing the media item so that it does not occupy as much memory space and/or complies with certain network bandwidth constraints. To perform such a balancing act, some companies have relied (and continue to rely) on compression algorithms. However, compression algorithms are usually not intelligent enough on their own to discriminate against distortions of little subjective importance and those that are objectionable to the end user. Furthermore, even if a compression artifact is detected today, no current means exists to efficiently remediate the compression artifact without re-compressing the entire multimedia item with a new compression algorithm. Such current methods are inefficient and consume many network resources.

Thus, there is an increased need for systems and methods that can efficiently address the challenges of detecting and remediating compression artifacts that appear in multimedia items, such as images, audio, and video.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
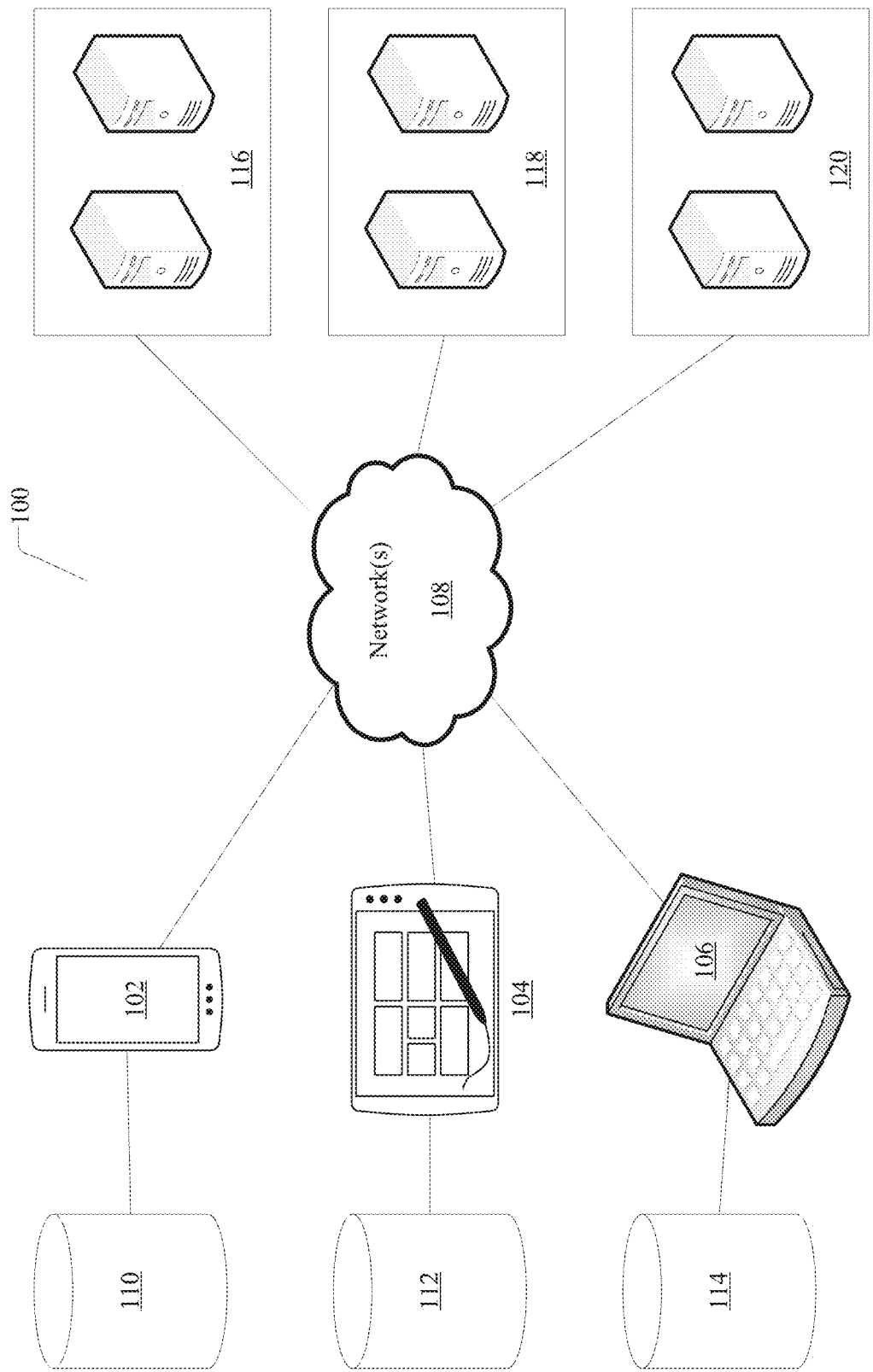
FIG. 1 illustrates an example of a distributed system for detecting and remediating compression artifacts.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with intelligent computer systems that detect and remediate compression artifacts in multimedia items. The systems and methods presented herein are also directed to artificial intelligence and machine learning algorithms that allow the systems and methods to accurately identify compression artifacts and quickly remediate compression artifacts.

Viewers of multimedia today are used to high compression ratios and artifacts that appear in wireless and mobile video due to certain compression techniques, such as from H.264/AVC or H.265/HEVC. However, there is a threshold where the experience becomes so poor that viewers will stop watching a certain multimedia item because the compression artifact is so objectionable. As such, a need exists to identify and remedy these compression artifacts so that the disruption to a viewer's experience is decreased or, in the best case, eradicated before the user even knows a compression artifact was present.

Compression artifacts can either be location-based (spatial) or time-/sequenced-based (temporal). Spatial artifacts are commonly seen when a video is paused, while temporal artifacts are seen when the video is actively playing. Some types of spatial artifacts include basis pattern, blocking, blurring, color bleeding, ringing, and staircase noise. Basis pattern artifacts are endemic to most compression algorithms and usually occur in regions like tress, fields of grass, ocean waves, etc. Blocking occurs when a compressed image is streamed over a low bandwidth connection. When the image is decompressed, the output of certain decoded blocks makes surrounding pixels appear as larger blocks. Blurring is another name for "fuzziness" and occurs as a result of loss of high spatial frequency image detail, usually in sharp edges. Color bleeding occurs when the edges of one color in the image unintentionally bleeds or overlaps into another color. Ringing (or "echoing" or "ghosting") appears in the form of a halo, band, or ghost near sharp edges. Ringing shows up usually during decompression because there is insufficient data to form a sharp edge (i.e., causing a "halo effect"). Staircase noise is a special case of blocking that appears as stair steps along a diagonal or curved edged.

Temporal artifacts, on the other hand, comprise flickering, floating, jerkiness, and mosquito noise. Flickering refers to the frequent luminance or chrominance changes over time. Fine-grain flickering is typically seen in slow-motion sequences with large motion or texture details. Floating is when the encoder erroneously skips predictive frames in a compression algorithm, causing illusory motion in certain regions while the surrounding areas remain static. For example, floating occurs in large areas of texture like surfaces of water or trees. Jerkiness is the perceived uneven or wobbly motion due to frame sampling. This often arises when a multimedia item is converted from a lower sampling rate to a higher sampling rate. Mosquito noise (also known as "edge busyness") resembles mosquitoes flying around. It is a variant of flickering and typically characterized as haziness or shimmering around high-frequency content.

As mentioned previously, objective evaluation of spatial and temporal compression artifacts is challenging, and current assessment models often fail to account for these artifacts, let alone quickly remedy them. As such, there is a need for systems and methods to intelligently detect and remediate compression artifacts in multimedia items. In some example embodiments, data regarding compression artifacts may first be collected and analyzed. Such analysis may be used to train at least one machine learning (ML) algorithm to automatically identify objectionable compression artifacts. As more multimedia items that contain compression artifacts are collected, analyzed, and used to train the ML algorithm(s), the ML algorithm(s) may become more intelligent, i.e., more accurately identify compression artifacts within multimedia streams. Once the ML algorithm(s) are trained, the ML algorithm(s) may be applied to incoming multimedia streams. Each frame of a multimedia item may be analyzed and compared against the ML algorithms. If a compression artifact is detected, a certain action response may be triggered. For instance, the compression artifact may be remedied in real-time via a bit rate adjustment and/or a correction at the uplink may occur where the multimedia item is retransmitted to the user device instantaneously. In other examples, an action response may be an automated smoothing process on the user device, where the multimedia item frame containing the compression artifact is stored locally, corrected locally, and re-displayed on the user device without the compression artifact.

In other embodiments, a user may indicate to a multimedia provider that a certain multimedia item contains a compression artifact. For instance, a user may indicate with a clicker device that a certain multimedia item has a compression artifact. The systems and methods described herein may receive the user indication along with a timestamp associated with the multimedia item currently being viewed on the user device. The systems and methods described herein may automatically capture that segment of the multimedia item, compare it against at least one trained ML algorithm, classify the results, and determine at least one action response, which may include taking immediate remedial action (e.g., adjusting bit rate, applying smoothing, re-compressing multimedia item, etc.).

In yet further example embodiments, the ML algorithm(s) described herein may be trained to discriminate between types of artifacts, such as spatial artifacts, temporal artifacts, and other weather-related artifacts, such as rain fade. For example, an artifact that appears that is typically associated with a physical obstruction of a satellite dish may be distinguished from a compression artifact that appears due to an error in the compression algorithm. In the case of an obstruction to a satellite, increasing the bit rate or processing power at the uplink would not solve the artifact issue and would thus result in a waste of resources. As such, the systems and methods described herein are able to distinguish between certain types of artifacts and determine when certain network resources should be deployed to remedy the compression artifacts that appear on a user device.

The techniques disclosed herein increase the speed of detecting and remediating compression artifacts as compared to traditional compression algorithms that are currently deployed in the field. The increased speed of detection and remediation of compression artifacts is attributed to the use of a pattern recognizer equipped with at least one ML model and a confidence threshold. Rather than require an exact match between a potential compression artifact in a multimedia item and a compression artifact already identified in a library, the disclosed ML based compression artifact detection system can detect compression artifacts based on recognized patterns and a confidence threshold without requiring an exact match of the multimedia items. For example, the pattern recognizer may be trained on a digital media item from a popular television show that contains numerous compression artifacts. The various compression artifacts may be extracted and identified during a training mode of the pattern recognizer, where at least one ML model is trained. The visual features of the compression artifacts may be aggregated by the pattern recognizer to establish a recognized pattern associated with that certain television show, a certain object in a frame, a certain geolocation displayed in the frame, etc. When a new multimedia item is collected by the system, the trained ML compression artifact detection and remediation system described herein is able to identify the compression artifacts of the new multimedia item, even though the ML model may not have been trained on that particular multimedia item. The compression artifact detection and remediation system is able to detect the compression artifacts because the new multimedia item may have similar visual features (e.g., fuzzy edges on a certain object, color bleeding, banding, etc.) and contain similar recognized patterns as the already-identified compression artifacts on which the ML model was trained. As such, the compression artifact detection and remediation system will determine if the visual features of the new multimedia item exceed a confidence threshold. If the threshold is exceeded, then a compression artifact may be detected and thwarted through remedial action.

Accordingly, the present disclosure provides a plurality of technical benefits including but not limited to: enabling more accurate and frequent detection of compression artifacts while using less memory storage and technical resources; determining digital media content contain compression artifacts without manually loading the digital media content into an external database for preprocessing; identifying multimedia features and patterns of compression artifacts in live broadcast and streaming media in real-time; enabling devices located remotely from each other to detect and remediate compression artifacts; and improving the quality of digital media content and content distribution by identifying and remediating compression algorithms, among other examples.

FIG. 1 illustrates an example of a distributed system for detecting and remediating compression artifacts. Example system 100 presented is a combination of interdependent components that interact to form an integrated whole for detection and remediation of compression artifacts. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to access and display digital content. In aspects, a client device, such as client devices 102, 104, and 106, may have access to one or more data sources comprising digital content. The data sources may be local to, or external to, the client device. The digital content may include, for example, video files, audio files, image files, text files, application documents, streaming content, and the like. For example, the client device may access digital content stored in a local database. As another example, the client device may execute a data streaming application or service that transmits digital content from one or more remote web servers or external data storage locations, such as server devices 116, 118, and/or 120. The streaming service may transmit digital content to the client device using network(s) 108. In yet other aspects, media may be broadcasted via satellite to client devices 102, 104, and/or 106. Client devices may include a television or other device capable of receiving a satellite and/or broadcast signal.

In some aspects, digital content received or accessed by the client device may be provided to one or more machine-learning (ML) models of a pattern recognizer. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, a server device, a network appliance (e.g., a firewall, a router, an uplink, etc.), or some combination thereof. Alternately, one or more rule sets or logic algorithms may be applied to the digital content. For example, a fuzzy logic algorithm to identify compression artifact characteristics and attributes (or states thereof) may be applied. The ML models may process the data to determine whether the digital content contains compression artifacts that may be due to compression errors as opposed to, e.g., satellite obstruction, rain fade, etc. Determining whether the digital content contains compression artifacts may comprise identifying various audio and/or video features of the digital content and evaluating the identified audio and/or video features against a previously identified set of audio and/or video features that are known to contain compression artifacts. In examples, when the identified audio and/or video features are determined to exceed a similarity threshold (e.g., the identified audio and/or video features are sufficiently similar to the previously identified set of audio and/or video features that contain compression artifacts), the digital content may be classified as containing compression artifacts. Based on the classification, the client device or a server device may perform (or cause the performance of) one or more actions, including remediating the compression artifacts for a subsequent stream and/or broadcast.

In some aspects, audio and/or video features of digital content that may be determined to have compression artifacts may be used to train the one or more ML models. For example, a set of labeled and/or unlabeled data may be used to train an ML model to identify digital media items that are sufficiently similar to the data used to train the model that contain compression artifacts. The training may include the use of one or more supervised or unsupervised learning techniques, including but not limited to pattern recognition techniques. The trained ML model may be deployed to one or more devices. As a specific example, an instance of a trained ML model may be deployed to a server device and to a client device. The ML model deployed to a sever device may be configured to be used by the client device when, for example, the client device is connected to the internet and/or receiving a broadcast signal. Conversely, the ML model deployed to a client device may be configured to be used by the client device when, for example, the client device is not connected to the internet. In such an example, the ML model may be locally cached by the client device.

Figure 2:
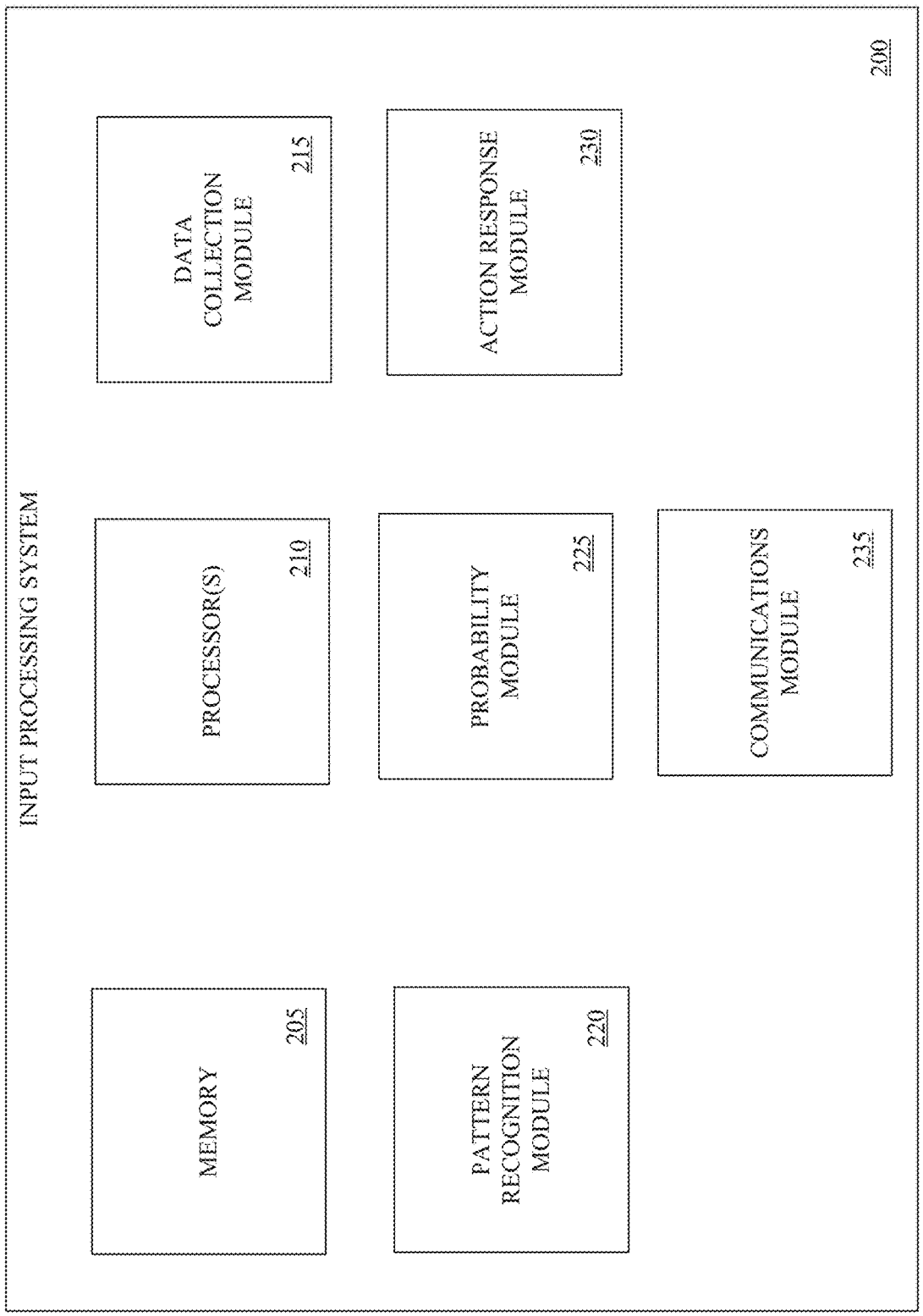
FIG. 2 illustrates an example input processing system for implementing systems and methods for compression artifact detection and remediating compression artifacts.

FIG. 2 illustrates an example input processing system for implementing systems and methods for compression artifact detection and remediating compression artifacts. The input processing system (e.g., one or more data processors) is capable of executing algorithms, software routines, and/or instructions based on processing data provided by a variety of sources related to compression artifact identification and discrimination (i.e., identifying artifacts related to errors in compression and artifacts related to rain fade, cloud cover, obstructions, etc.). The input processing system can be a general-purpose computer or a dedicated, special-purpose computer. According to the embodiments shown in FIG. 2, the disclosed system can include memory 205, one or more processors 210, data collection module 315, pattern recognition module 320, probability module 225, action response module 230, and communications module 235. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of data collection module 215, pattern recognition module 220, probability module 225, action response module 230, and communications module 235. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one trained ML model that may be applied to data collected by data collection module 215.

Data collection module 215 may be configured to collect customer, account, and/or device information, along with multimedia data information that is displayed or used on a device from one or more data sources. Data collection module 215 may also be configured to analyze multimedia content received from a provider at an uplink prior to that multimedia content being streamed and/or broadcasted on an end-user device. In aspects, input processing system 200 may detect, or otherwise be informed of, devices (e.g., customer devices, user devices, network appliance devices, etc.) that have connected to input processing system 200 or a network thereof. Input processing system 200 may collect and/or store information related to the detected/connected devices and/or the corresponding users. Data collection module 215 may have access to the information collected/stored and may collect or aggregate at least a portion of the collected/stored information. For example, candidate digital media items may be collected and stored by the data collection module 215. Alternately, data collection module 215 may interrogate, or otherwise solicit data from, one or more data sources comprising such information. For example, data collection module 215 may have access to data in one or more external systems, such as content systems, distribution systems, marketing systems, user profiles or preference settings, authentication/authorization systems, device manifests, or the like. Data collection module 215 may use a set of APIs or similar interfaces to communicate requests to, and receive response data from, such data sources. In at least one example, the data collection process of data collection module 215 may be triggered according to a present schedule, in response to a specific user request to collect data, or in response to the satisfaction of one or more criteria (e.g., opening and running a streaming application on a client device). Data collection module 215 may also receive information from devices such as set-top boxes and the like. Data collection module 215 may be configured to receive real-time broadcasts of multimedia items that are broadcasted to end-user devices (e.g., televisions, mobile devices, etc.).

Pattern recognition module 220 may be configured to identify and extract various multimedia features and/or data objects of a digital media item to create recognized patterns. A digital media item may be a video clip (e.g., YouTube video clip), a broadcast media item (e.g., via cable), an Internet streaming media item (e.g., a television show or movie), or an image, among other media items. In aspects, pattern recognition module 220 may have access to data collected by data collection module 215. Pattern recognition module 220 may perform one or more processing operations on the collected data. The processing operations may include identifying a set of features and/or objects of the collected data, organizing the identified features and/or objects into one or more groups (such as feature and/or object vectors), and sorting the data according to one or more criteria (e.g., audio and/or visual attributes). The processing operations may additionally include separating audio features from visual features and vice versa. Audio features that may be identified and extracted by pattern recognition module 220 include but are not limited to the timbre, pitch, intonation, intensity, and volume of the audio. Pattern recognition module 220 may utilize waveplots, spectrograms, log power spectrograms, and other methods to identify and extract various audio features. For example, the amplitude of a person speaking may be more variable in a waveplot as compared to the amplitude of background music.

In aspects, pattern recognition module 220 may also be configured to extract and identify visual features and objects from the collected data received from data collection module 215. For example, pattern recognition module 220 may utilize pixel recognition algorithms, object extraction techniques, and convolutional neural networks to identify and extract visual features and objects that resemble compression artifacts. In one aspect, pattern recognition module 220 may extract clearly-defined human objects from a graphical image, where the human object data may comprise the shape and outlines of the human objects and/or facial features, among other visual data. In other aspects, pattern recognition module 220 may extract fuzzy or distorted human objects from a graphical image (e.g., video frame). Eventually, comparing the clearly-defined human objects in a frame with a fuzzy human object in a similar frame may indicate the presence of a compression artifact. In another aspect, pattern recognition module 220 may identify and extract color schemes and environment layouts from the collected data of data collection module 215. In at least one example, the identified and extracted multimedia features may be accessible to data collection module 215 during the data collection process described above. In yet further examples, the pattern recognition module 220 may be configured to aggregate the extracted features into a feature vector that defines an established pattern. For example, pattern recognition module 220 may extract ten features from a certain frame in a television show. Five of those features may be audio features, such as a theme song and/or the tonality of the voice of a main character. The remaining five features may be visual features, such as object placement and/or garment and environment color schemes. The combination of the ten features may be used to construct a feature vector that defines a recognized pattern. The recognized pattern may then be used to train a machine learning model that will be compared against other similar multimedia items, such as other episodes of that same television show, digital content taking place in the same setting, digital content that displays the same actors and/or actresses, etc. The comparison results may determine whether or not other similarly-related multimedia content contains compression artifacts.

In aspects, pattern recognition module 220 may include two modes: a training mode and a processing mode. During the training mode, the pattern recognition module 220 may use the identified and extracted compression artifact features from multimedia items to train one or more ML models. Once the one or more ML models are trained, the pattern recognition module 220 may enter processing mode, where input data is compared against the trained ML models in the pattern recognizer. The pattern recognizer may then produce a confidence score that denotes the confidence of certain multimedia features appearing in the input data, with a high confidence score being associated with a higher likelihood of a compression artifact being present. In other aspects, during training mode, pattern recognition module 220 may use different types of errors and artifacts within a multimedia item to train one or more ML models to distinguish between certain compression artifacts. For instance, artifacts that are associated with low bandwidth may have certain features (e.g., fuzziness around the edges of certain objects in a frame of a multimedia item) as compared to rain fade errors (e.g., blockiness unrelated to the objects in a frame of a multimedia item).

Pattern recognition module 220 may be configured with at least one machine learning model. In some aspects, the compression artifact features extracted from multimedia items may be used to train at least one machine learning model in the pattern recognition module 220 during training mode. For example, to train the machine learning model, the extracted and identified compression artifacts may be associated with specific multimedia identifiers, such as television show, movie, music, setting, object, actor/actress, and other multimedia titles. Pattern recognition module 220 may utilize various machine learning algorithms to train the machine learning model, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. The aforementioned machine learning algorithms may also be applied when comparing input data to an already-trained machine learning model. Based on the identified and extracted compression artifact features and patterns, pattern recognition module 220 may select the appropriate machine learning algorithm to apply to the compression artifacts to train the at least one machine learning model. For example, if the received artifacts are complex and demonstrate non-linear relationships, then pattern recognition module 220 may select a bagging and random forest algorithm to train the machine learning model. However, if the artifact features demonstrate a linear relationship to certain multimedia assets, then pattern recognition module 220 may apply a linear or logistic regression algorithm to train the machine learning model.

In other aspects, pattern recognition module 220 may apply at least one already-trained machine learning model to the received multimedia features and patterns to detect previously identified and extracted artifacts and previously recognized patterns. Pattern recognition module 220 may be configured to compare at least one trained machine learning model to the multimedia features to generate comparison results that indicate whether the multimedia features contain compression artifacts, non-compression artifacts, or no artifacts. Specifically, pattern recognition module 220 may compare the identified and extracted audiovisual features of the digital media item to at least one model trained on previously received multimedia features that are associated with specific multimedia identifiers. Pattern recognition module 220 is also configured to generate comparison results, indicating the similarity (or lack thereof) between certain multimedia assets on which the machine learning model was trained and the multimedia features. In other aspects, the comparison results may include a compression artifact confidence indicator that a certain compression artifact is present in a multimedia item. For instance, the comparison results may generate a compression artifact confidence indicator that a specific compression artifact is present in the multimedia features and/or patterns. The comparison results may include compression artifact confidence indicator information regarding identified compression artifacts and non-compression artifacts in the received multimedia features and/or patterns. The compression artifact confidence information may then be used in determining the overall confidence value.

In other embodiments, input processing system 200 may be designed in a multi-state configuration and include more than one machine learning model and/or algorithm. In such embodiments, a first machine learning model may be trained to recognize one type of artifact (e.g., compression temporal artifact, spatial artifact, data loss artifact, blockiness, color-banding, etc.), and a second machine learning model may be trained to recognize another type of artifact. For example, one machine learning model may be trained on specific types of compression artifact features (e.g., blocky pixels), and another machine learning model may be trained on other types of compression artifact features (e.g., fuzzy edges, color-banding, etc.). In other aspects, multiple machine learning models may be distributed within the input processing system 200. A multi-state configuration allows for multiple machine learning models to process data simultaneously, thereby increasing processing power and speed, which may translate to more accurate compression artifact determinations of the input data. The comparison results generated by each machine learning model in a multi-state configuration may be aggregated prior to transmitting to the probability module 225.

Probability module 225 may be configured to receive and process the comparison results generated by pattern recognition module 220. In aspects, probability module 225 may utilize one or more rule sets comprising criteria for evaluating the comparison results. The rule sets may comprise one or more rules, predicates, actions, and/or threshold values. The rules may be generated statically by one or more users, or dynamically by one or more components of input processing system 200. For instance, probability module 225 may dynamically generate (or retrieve) a set of rules based on attributes of the digital media item (e.g., media item name, type, size, create date, author, distribution channel, etc.). In a particular example, probability module 225 may use a rule set comprising a static rule for evaluating processing results and at least one confidence threshold that must be met (or exceeded) to perform an action associated with the rule. The confidence threshold may be a predetermined threshold that is defined/set manually. In aspects, the confidence threshold may be a value representing a number of identified artifacts of a multimedia item. For example, if the confidence threshold is set at "10 artifacts," identifying a combination of five audio and five visual artifacts and/or objects from a recognized pattern may breach the confidence threshold, thereby triggering an action response. In other examples, probability module 225 may classify the comparison results from pattern recognition module 220 as a certain confidence value, range of values, or label. For example, the confidence value may be in the form of a percentage indicating the confidence (e.g., 70% confidence value) that the received digital media item contains a compression artifact due to an error with a compression algorithm and not an artifact due to rain fade or obstruction of a satellite. The classified confidence value may be compared against a confidence threshold. Based on the comparison, probability module 225 may determine whether the confidence value exceeds the confidence threshold. If the confidence value is equal to or exceeds the confidence threshold, probability module 225 may classify the received input data from data collection module 215 as most likely containing a compression artifact in need of remediation. If the confidence value is less than the confidence threshold, then the probability module 225 may classify the input data as not containing a compression artifact in need of remediation.

In some example aspects, probability module 225 may be configured to discern whether a certain compression artifact is substantial enough to warrant remediation. For example, pattern recognition module 220 may produce comparison results that reveal a compression artifact in a certain multimedia item. However, a certain rule applied to the comparison results received from pattern recognition module 220 may designate the identified compression artifact as inconsequential, resulting in the probability module 225 applying a confidence threshold value of less than the threshold required for the multimedia item to receive remediation for a compression artifact. Certain rules sets within the probability module 225 may rank certain compression artifacts on a scale of importance. This scale may be used to determine a certain confidence threshold for particular types of multimedia items.

Action response module 230 may be configured to receive classification results from probability module 225 and may also be configured to deploy an action response based on the classification results received from probability module 225. Action response module 230 may be configured to deploy remedial action in the event that input data is classified as containing at least one compression artifact. Remedial actions may include but are not limited to increasing bandwidth availability, swapping out a multimedia item with artifacts with an artifact-free multimedia item at the uplink, applying sharpness or smoothing algorithms in realtime (e.g., locally on a client device or remotely over a network), and buffering to allow the remediation system to apply a remedy to the multimedia item, among other remedial actions. In some aspects, action response module 230 may be configured to deploy action responses regardless of client device type or streaming media type. In other aspects, action response module 230 may employ machine learning techniques to determine the most appropriate action response based on previously applied action responses and the results following the application of the action responses. For example, some action responses may be more successful in remediating certain compression artifacts on certain device platforms than other action responses. Based on the historical data of success rates of applied action responses and other collected information (e.g., device identifiers, operating system, browser type, etc.), a machine learning model may be trained to learn which types of action responses are most successful in remediating compression artifacts in multimedia items. In at least one example, action response module 230 is configured to record and store action responses and receive data related to the results of applying the action response(s).

Communications module 230 is associated with sending/receiving information (e.g., collected by data collection module 215) with a remote server or with one or more client devices, streaming devices, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 235 sends information collected by data collection module 215 and processed by pattern recognition module 220, probability module 225, and action response module 230. Furthermore, communications module 230 may be configured to communicate an action response from action response module 230 to a client device and/or uplink device to remediate a certain compression artifact located in a multimedia item. Communication module 235 may be configured to transmit that action response to the correct device location for effective remediation.

Figure 3:
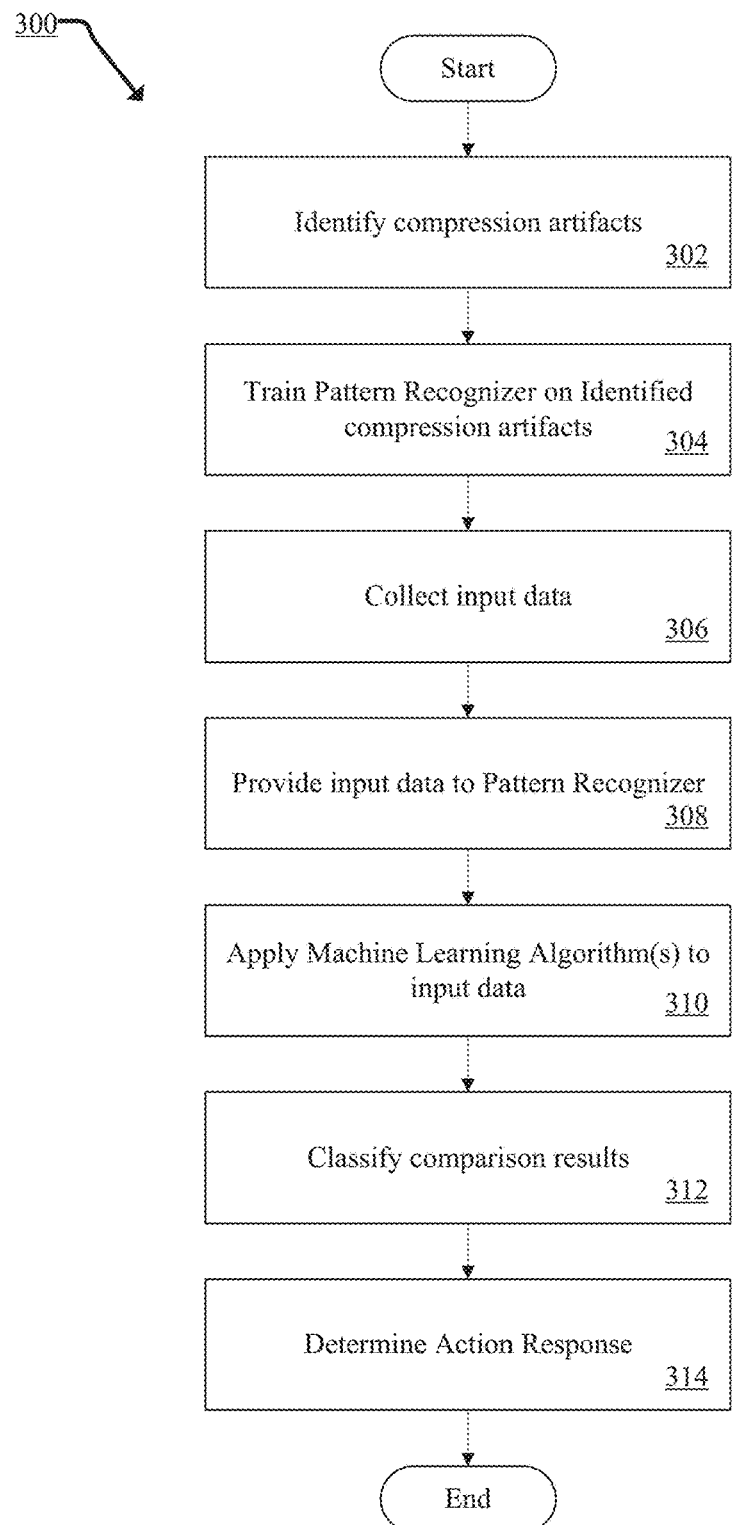
FIG. 3 illustrates an example method for detecting and remediating compression artifacts, as described herein.

FIG. 3 illustrates an example method for detecting and remediating compression artifacts, as described herein. In aspects method 300 may be executed by various systems, such as system 200 of FIG. 2 and may be executed on one or more devices comprising at least one processor configured to store and execute operations, programs, and/or instructions. However, method 300 is not limited to such examples. In other examples, method 300 may be performed by an application or service for detecting and remediating compression artifacts. In at least one aspect, method 300 may be executed (e.g., computer-implemented operations) by one or more components of a distributed network, such as a web service or a distributed network service (e.g., cloud service).

Method 300 begins at operation 302 where multimedia features associated with input data are identified and extracted. Multimedia features may include but are not limited to audio features and visual features. Audio features include but are not limited to timbre, pitch, intonation, intensity, and volume. Visual features may include but are not limited to pixel volume, pixel placement, color scheme, environment layout, shape outlines, and object placement, among other visual features. The multimedia features identified and extracted at operation 302 may be associated with specific multimedia titles and assets. Multimedia titles may include titles of television shows, movies, songs, albums, etc. Multimedia assets may include but are not limited to actor and actress names, producers, production companies, film companies, character names, character voices, etc.

At operation 304, at least one pattern recognizer (such as pattern recognition module 220) is trained on identified and extracted multimedia features from operation 302. As discussed previously, the pattern recognizer includes at least one machine learning model that is trained. Operation 304 is akin to "training mode" of pattern recognition module 220. The machine learning model(s) within the pattern recognizer may be trained on the multimedia features using a variety of machine learning algorithms, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. Targets (or target attributes) may be mapped to the multimedia features. For example, a certain visual blemish (e.g., fuzziness around the edges of a common object) may be associated with a certain type of compression artifact. In other words, certain visual features may be mapped to certain multimedia assets (e.g., television shows, movies, etc.), and those same visual features may be mapped to certain compression artifacts. The machine learning model(s) is trained on this mapping of multimedia features to multimedia assets to find and establish patterns and/or confirm the frequency of recognized patterns established by pattern recognition module 220. The machine learning model, once trained, will be able to identify future patterns of compression artifacts and other visual and audio blemishes in input data based on the previously mapped multimedia features and previously recognized patterns.

At operation 306, input data is collected. Input data may include but is not limited to device type, device configuration information, browser type, streaming media information, multimedia features, GPS data, and other information associated with the device and streaming media items. In at least one aspect, input data may comprise a candidate multimedia object. The candidate multimedia object may be a multimedia object delivered via a live broadcast to a television or via an online streaming service over the Internet. For example, a candidate multimedia object may be a popular television show that is streamed in a web browser on the Internet. In another example, a candidate multimedia object may be a live news broadcast transmitted via satellite to a set-top box.

In other example aspects, input data may be collected at operation 306 via end users. For example, end users may be able to indicate to the system described herein when a certain multimedia item contains a compression artifact. A user may indicate the existence of a compression artifact (or other visual or audio error) in a multimedia item by pressing a button on a remote, for instance. The action of pressing a particular button on the remote may be registered by the system, along with information regarding the multimedia item (e.g., exact time in the multimedia item stream/broadcast, which multimedia item is being displayed at the time the button is pressed, on which frame or frames was the button pressed, etc.). This end-user indication of the presence of a potential compression artifact may be transmitted to remote server for further analysis where at least one ML model may be applied to a certain subset of the multimedia item that was flagged by the end-user. In some example aspects, a more robust ML model may be applied to such subsets of a multimedia item to identify and remediate compression artifacts. Other input mechanisms may be used to indicate the presence of a compression artifact in a livestream or live broadcast (e.g., using a mobile device to communicate the existence of a potential compression artifact).

At operation 308, the input data is passed to the pattern recognizer (such as pattern recognition module 220), where the multimedia features of the input data are identified and extracted and grouped together to form patterns associated with compression artifacts. The multimedia features may include but are not limited to audio features and visual features. The processing operations may include organizing the collected data into one or more groups and/or sorting the data according to one or more criteria in order to create and identify recognized patterns. The processing operations may additionally include separating audio features from visual features. Further description of the multimedia features are described with respect to the pattern recognition module 220 from FIG. 2

At operation 310, the processed input data is provided to at least one of the machine learning models within the pattern recognizer. Operation 310 is akin to "processing mode" of pattern recognition module 220. The trained machine learning model receives and evaluates the processed input data, which may include feature vectors representing recognized patterns appearing in various multimedia items. Comparison results may be generated by the trained machine learning model. As a specific example, the machine learning model may compare the identified and extracted multimedia features of the received input data to at least one model trained on previously received multimedia features and target attributes that are associated with specific visual blemishes, such as compression artifacts and non-compression artifacts (e.g., satellite obstruction, snow, rain fade, etc.). The comparison results generated by the pattern recognizer may be used to predict whether the input data contains compression artifacts. In some aspects, the comparison results may include a compression artifact confidence indicator (e.g., 70% confidence that the media item contains a particular compression artifact that is in a database/library of already-identified compression artifacts) as to whether a certain artifact is present in the processed input data. For example, the comparison results may include information indicating how confident the model is that one or more particular actors, objects, theme songs, etc. contain errors in the processed input data. In another aspect, the comparison results may include information indicating how confident the model is that one or more recognized patterns appear in the processed input data. The media item confidence results may be relied upon in determining the overall confidence value.

At operation 312, the comparison results generated at operation 310 are classified as either containing compression artifacts or not containing compression artifacts. In other examples, the comparison results may be classified as either substantially containing compression artifacts or not substantially containing compression artifacts (i.e., a certain frame of a multimedia item may contain a compression artifact; however, the compression artifact may be so trivial that the system determines it is not worth correction). In aspects, the comparison results from operation 310 may be converted into a confidence value by aggregating the comparison results (e.g., pixel matches or mismatches, color matches or mismatches, audio errors, etc.) and distilling those comparison results into a value (e.g., a percentage, a label, etc.). The confidence value may represent an arbitrary numeric value, e.g., on a scale from 1 to 10, with "1" representing a low confidence of the presence of a compression artifact and "10" representing a high confidence of the presence of a compression artifact. If a certain volume of multimedia features from the input data is found to be similar to previously processed multimedia that contains compression artifacts based on the machine learning model, then a higher confidence score may be generated. For example, if a confidence threshold is set at "10 features," identifying a combination of eight audio and/or visual features from a recognized pattern may produce a confidence value of 80% (e.g., 10% assigned for each of the eight identified features). The confidence value may be compared to a confidence threshold. In some aspects, the confidence threshold may be a fixed threshold. If the confidence value equals or exceeds the confidence threshold value, the input data may be classified as containing compression artifacts. For example, if the confidence threshold is set at "7" and the confidence value is "8," input data may be classified as containing compression artifacts. If the confidence value is less than the confidence threshold value, the input data may be classified as not containing compression artifacts.

At operation 314, an action response is determined based on the classification of the input data. In aspects, when a compression artifact is detected at operation 312, an action response may be determined and/or executed. For example, in response to detecting at least one compression artifact, a signal transmission to increase the bandwidth of a livestream may be generated. In another example, a buffering pop-up message may be displayed on a particular device, notifying the user that the multimedia item will resume streaming/broadcasting momentarily after the compression artifact is corrected. In yet another example, an action response may comprise notifying the network provider of a particular device that has viewed a compression artifact and that further analysis is needed to determine whether a certain multimedia item needs to be remedied at the uplink. In still yet another example, the action response may be the application of a smoothing algorithm that is local to a device. For instance, a user may be viewing a certain multimedia item offline, but the downloaded multimedia item contained a compression artifact. While viewing the downloaded multimedia item, the system may detect that a certain frame contains a compression artifact (e.g., blockiness layered on top of an object), and a smoothing or sharpening algorithm may be applied to that frame in real-time, so that any disruption in the user viewing experience may be diminished. In yet another example, a compression artifact notice may be transmitted to a designated analysis team, prompting the analysis team to take manual steps to correct a certain compression artifact. Such a remedial action may occur if a certain frame is flagged multiple times as containing a compression artifact, and the automated system of identifying and remediating compression artifacts does not automatically remedy the compression artifact (i.e., the compression artifact remains unfixed after going through the automated system). In aspects, if the classification from operation 312 indicates that the input data does not contain compression artifacts (or does not contain a certain level of compression artifacts), it may be determined that no action response is needed.

Figure 4:
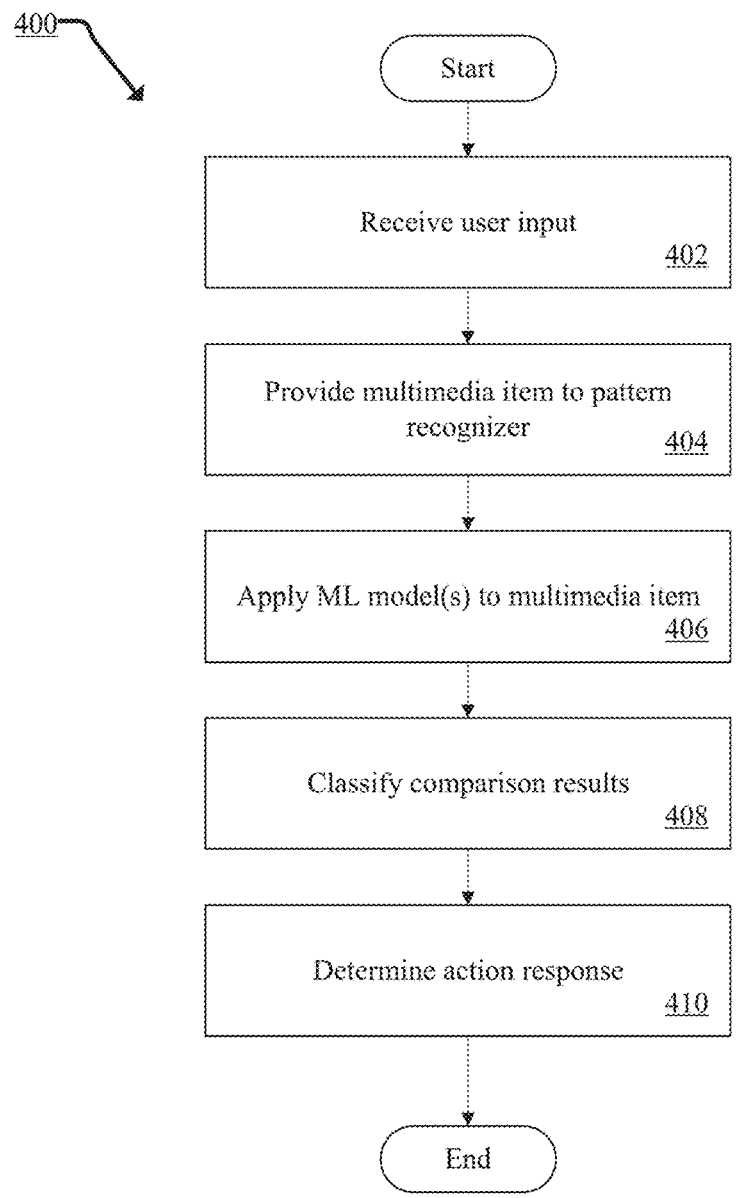
FIG. 4 illustrates an example method for detecting and remediating compression artifacts based on received user input, as described herein.

FIG. 4 illustrates an example method for detecting and remediating compression artifacts based on received user input, as described herein. As previously mentioned with respect to operation 306 in FIG. 3, user feedback loops may be utilized to identify compression artifacts, as well as train at least one ML model to correct future compression artifacts. Method 400 begins with operation 402, receive user input. User input may be received via a television clicker (e.g., remote). While viewing a certain multimedia item on a device, a user may perceive a visual error in a certain scene (i.e., frame(s)). The user may indicate to the system by pressing a button on the remote that an error is perceived. Upon clicking the button on the remote, the system may receive the indication, as well as capture information regarding the multimedia item (e.g., which multimedia item is currently being displayed, timestamp, frame(s) implicated, current weather in user zip code to determine if visual error is likely due to compression errors or non-compression errors, etc.).

Upon receiving this indication, the method proceeds to operation 404, provide multimedia item to pattern recognizer, where the multimedia features of the multimedia item are identified and extracted and grouped together to form patterns associated with compression artifacts. The multimedia features may include but are not limited to audio features and visual features. The processing operations may include organizing the collected data into one or more groups and/or sorting the data according to one or more criteria in order to create and identify recognized patterns. The processing operations may additionally include separating audio features from visual features. Further description of the multimedia features are described with respect to the pattern recognition module 220 from FIG. 2

At operation 406, the processed multimedia item flagged by the user is provided to at least one of the machine learning models within the pattern recognizer. Operation 406 is akin to "processing mode" of pattern recognition module 220. The trained machine learning model receives and evaluates the processed multimedia item (or subset of the processed multimedia item based on the user input flagging the existence of a potential compression artifact), which may include feature vectors representing recognized patterns appearing in various multimedia items. Comparison results may be generated by the trained machine learning model. As a specific example, the machine learning model may compare the identified and extracted multimedia features of the received input data to at least one model trained on previously received multimedia features and target attributes that are associated with specific visual blemishes, such as compression artifacts and non-compression artifacts (e.g., satellite obstruction, snow, rain fade, etc.). For instance, the trained model may have been trained on the master copy received by the content owner. A quick comparison between the copy streamed/broadcasted to the user and to the master copy may reveal whether compression artifacts existed in the master copy in the first place (in which case, an appropriate remedial action may be to request a new copy of the multimedia item from the content owner). The comparison results generated by the pattern recognizer may be used to predict whether the multimedia item contains compression artifacts. In some aspects, the comparison results may include a compression artifact confidence indicator (e.g., 70% confidence that the media item contains a particular compression artifact that is in a database/library of already-identified compression artifacts) as to whether a certain artifact is present in the processed input data. For example, the comparison results may include information indicating how confident the model is that one or more particular actors, objects, theme songs, etc. contain errors in the processed input data. In another aspect, the comparison results may include information indicating how confident the model is that one or more recognized patterns appear in the processed input data. The media item confidence results may be relied upon in determining the overall confidence value.

At operation 408, the comparison results generated at operation 406 are classified as either containing compression artifacts or not containing compression artifacts. In other examples, the comparison results may be classified as either substantially containing compression artifacts or not substantially containing compression artifacts (i.e., a certain frame of a multimedia item may contain a compression artifact; however, the compression artifact may be so trivial that the system determines it is not worth correcting). In aspects, the comparison results from operation 406 may be converted into a confidence value by aggregating the comparison results (e.g., pixel matches or mismatches, color matches or mismatches, audio errors, etc.) and distilling those comparison results into a value (e.g., a percentage, a label, etc.). The confidence value may represent an arbitrary numeric value, e.g., on a scale from 1 to 10, with "1" representing a low confidence of the presence of a compression artifact and "10" representing a high confidence of the presence of a compression artifact. If a certain volume of multimedia features from the input data is found to be similar to previously processed multimedia that contains compression artifacts based on the machine learning model, then a higher confidence score may be generated. For example, if a confidence threshold is set at "10 features," identifying a combination of eight audio and/or visual features from a recognized pattern may produce a confidence value of 80% (e.g., 10% assigned for each of the eight identified features). The confidence value may be compared to a confidence threshold. In some aspects, the confidence threshold may be a fixed threshold. If the confidence value equals or exceeds the confidence threshold value, the input data may be classified as containing compression artifacts. For example, if the confidence threshold is set at "7" and the confidence value is "8," input data may be classified as containing compression artifacts. If the confidence value is less than the confidence threshold value, the input data may be classified as not containing compression artifacts.

At operation 410, an action response is determined based on the classification of the input data (e.g., multimedia item delivered to end-user and/or subset of frames from multimedia item delivered to end-user). In aspects, when a compression artifact is detected at operation 408, an action response may be determined and/or executed. For example, in response to detecting at least one compression artifact, a signal transmission to increase the bandwidth of a livestream may be generated and/or more technological resources may be applied to "boost" the system to decrease future compression artifacts. In another example, a buffering pop-up message may be displayed on a particular device, notifying the user that the multimedia item will resume streaming/broadcasting momentarily after the compression artifact is corrected. In yet another example, an action response may comprise notifying the network provider of a particular device that has viewed a compression artifact and that further analysis is needed to determine whether a certain multimedia item needs to be remedied at the uplink. In still yet another example, the action response may be the application of a smoothing algorithm that is local to a device (e.g., set-top box, mobile device, etc.). For instance, a user may be viewing a certain multimedia item offline, but the downloaded multimedia item contained a compression artifact. While viewing the downloaded multimedia item, the system may detect that a certain frame contains a compression artifact (e.g., blockiness layered on top of an object), and a smoothing or sharpening algorithm may be applied to that frame in real-time, so that any disruption in the user viewing experience may be diminished. In yet another example, a compression artifact notice may be transmitted to a designated analysis team, prompting the analysis team to take manual steps to correct a certain compression artifact. Such a remedial action may occur if a certain frame is flagged multiple times as containing a compression artifact, and the automated system of identifying and remediating compression artifacts does not automatically remedy the compression artifact (i.e., the compression artifact remains unfixed after going through the automated system). In aspects, if the classification from operation 408 indicates that the input data does not contain compression artifacts (or does not contain a certain level of compression artifacts), it may be determined that no action response is needed.

In some examples, the system may determine that the applied remedial action may or may not have corrected the compression artifact. If there is a certain level of uncertainty that a remedial action was successful, then the remediated multimedia item may be transmitted back to the pattern recognizer at operation 404. The remediated multimedia item may then be analyzed through operations 404-410 a second time to determine whether additional compression artifacts exist and whether additional remedial actions are needed.

Figure 5A:
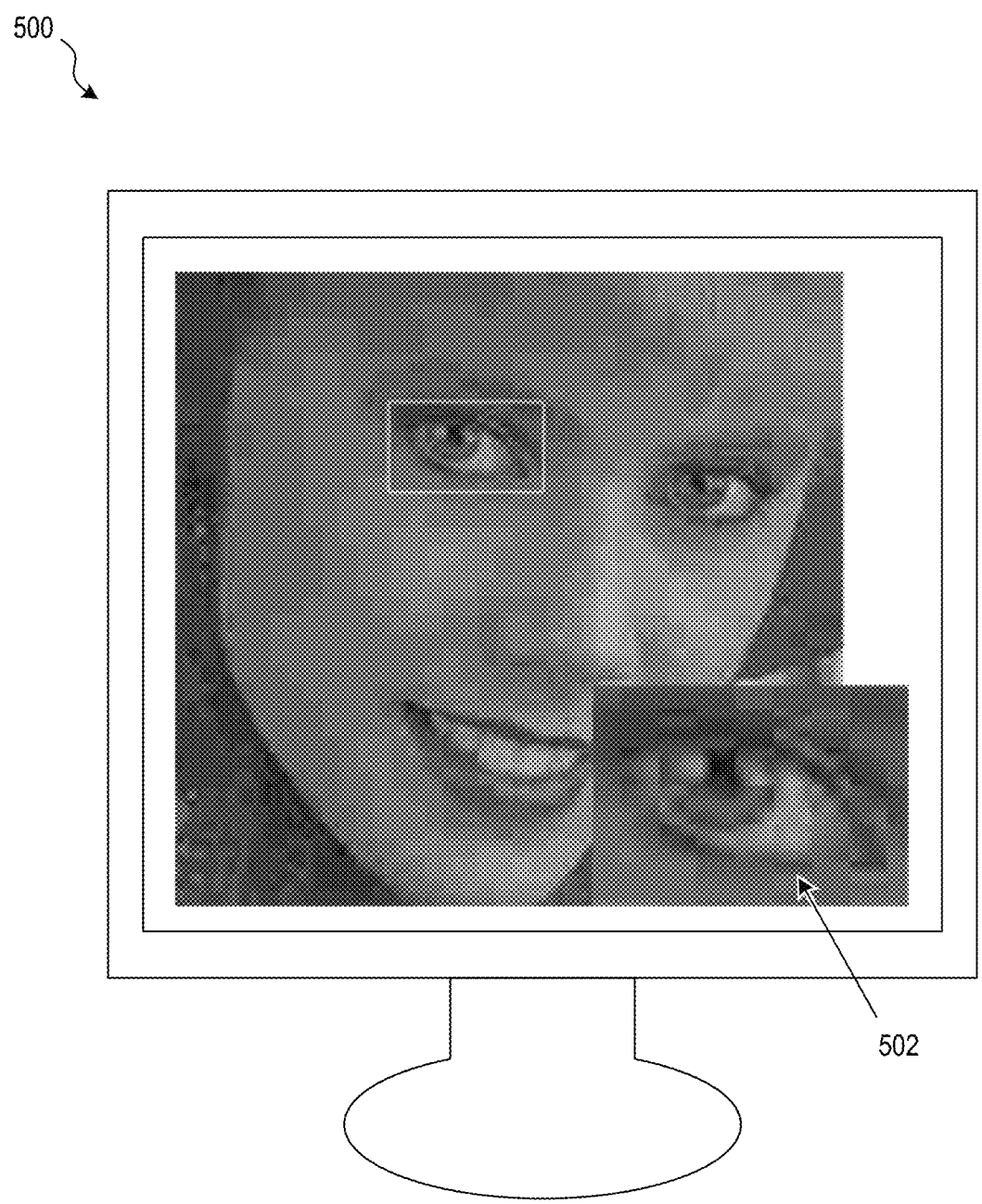
FIGS. 5A and 5B illustrate an example of an image with at least one compression artifact and an image with at least one remediated compression artifact
Figure 5B:
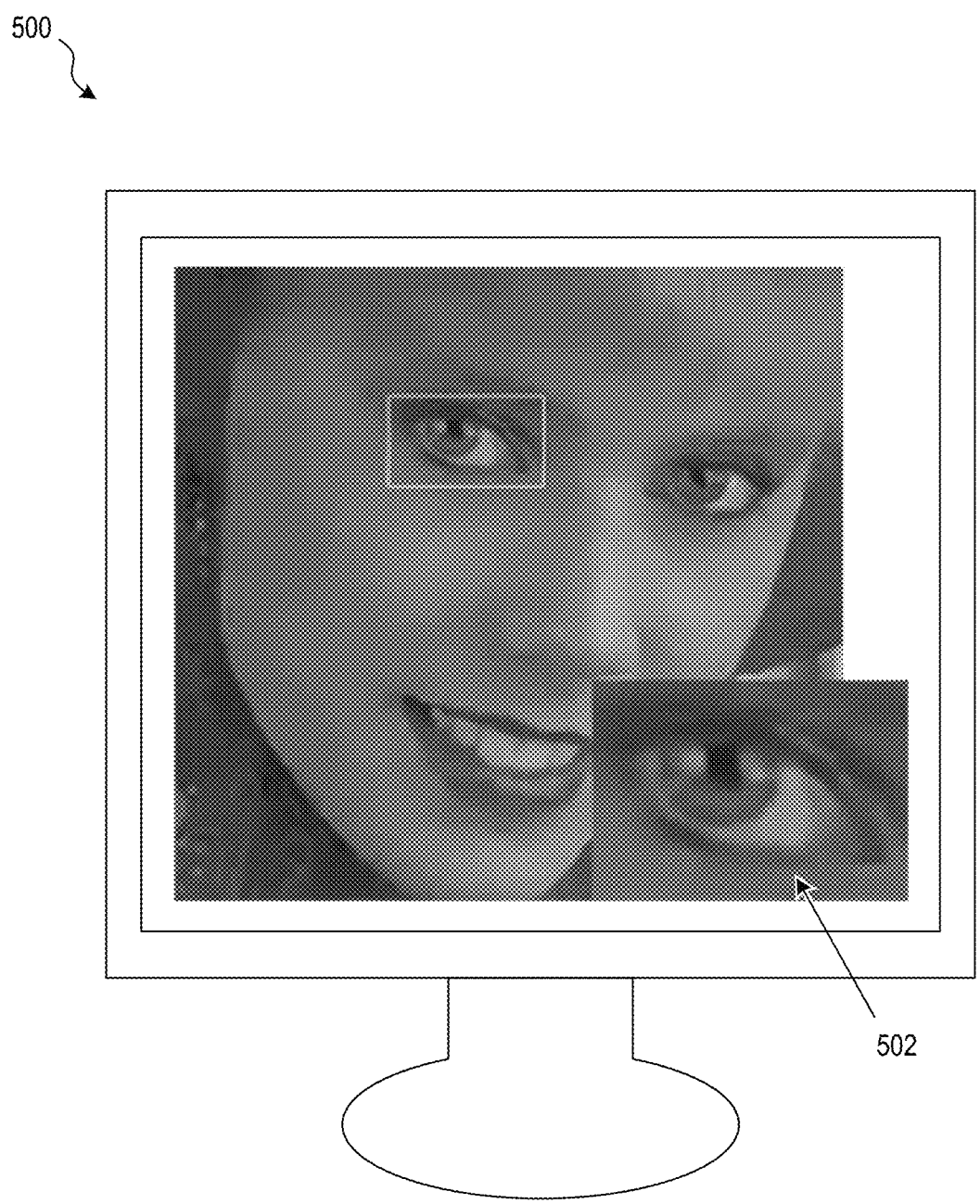

FIGS. 5A and 5B illustrate an example of an image with at least one compression artifact and an image with at least one remediated compression artifact. Digital media item 500 is comprised of various visual features, including but not limited to physical shapes, objects, and colors. In particular, FIGS. 5A and 5B highlight the human eye with compression artifacts and the result of the human eye once the systems and methods for identifying and remediating compression artifacts, as described herein, is applied.

In aspects, if digital media item 500 was received by the compression artifact detection and remediation system described herein, digital media item 500 may be processed by pattern recognition module 220 at operation 308. Pattern recognition module 220 may identify and extract particular multimedia features and recognize certain patterns, such as a particular visual feature or a combination of audio/visual features that comprise a recognized pattern, such as the combination facial features. The multimedia features may be provided to a trained machine learning model within the pattern recognition module 220 at operation 310, where the multimedia features are compared to a trained machine learning model. The trained machine learning model may have been trained on previous images (e.g., specifically human faces with and without compression artifacts) and multimedia features from the multimedia item from which digital media item 500 may originate (i.e., digital media item 500 may be a still frame from a television show or a movie). The comparison results between the machine learning model and the multimedia features of digital media item 500 may be converted into a confidence value that is compared to a confidence threshold to determine if digital media item 500 contains compression artifacts. For example, each compression artifact may be allocated a value of 0.2. If at least ten compression artifacts exist in the frame, then the sum may equal 2.0. The sum value 2.0 may be compared to a threshold value (e.g., 1.0) to determine if the digital media item is more or less likely to contain compression artifacts. In one aspect, if the human eye visual feature 502 is the only identified and extracted feature from digital media item 500, then the confidence value that may be generated may be less than the confidence threshold, and therefore, the digital media item 500 may not be determined to contain sufficient compression artifacts to warrant remedial action. For example, each human eye identified in the frame may be allocated a value of 0.4. If the human eye 502 is the only digital media feature observed in a frame with potential compression artifacts, then the value of 0.4 may be compared against a threshold value (e.g., 1.0), and because if 0.4 is less than the threshold value, then the digital media item 500 may not be flagged as containing sufficient compression artifacts to warrant remediation. In such a situation, FIG. 5A would not have compression artifacts located on the face, mouth, and other areas of the frame, but simply be limited to a single eye. In other words, if a frame contained compression artifacts on a single eye in the frame but the rest of the frame was without compression artifacts, then such a low volume of compression artifacts in the frame as a whole may not meet the remedial action threshold set by the system. However, if a particular pattern of multimedia features and objects (e.g., eye in combination with nose, lips, cheeks, hair, etc.) was identified as containing compression artifacts, then the comparison results may lead to a confidence value that may exceed the confidence threshold, and the digital media item 500 may be determined to have compression artifacts and in need of remedial action.

Figure 6:
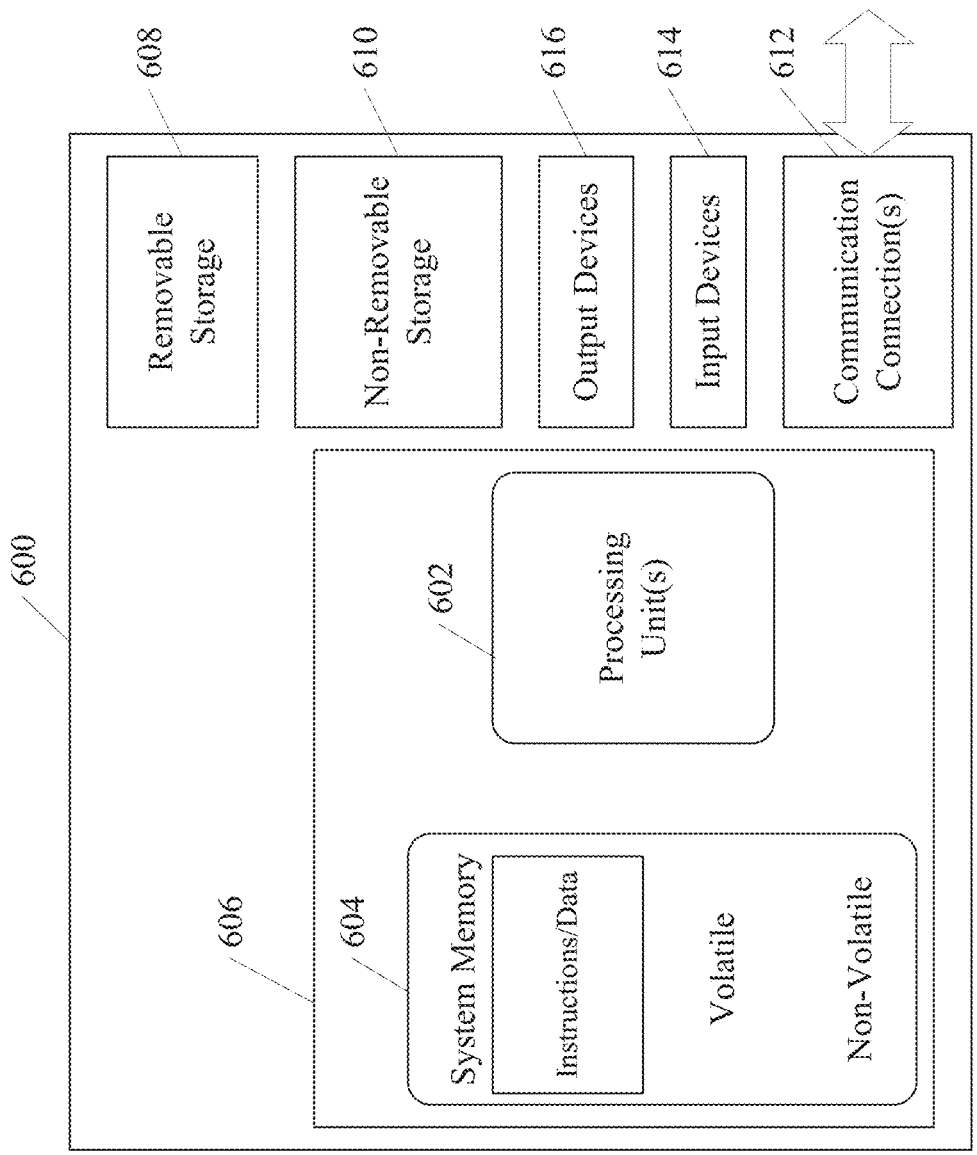
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein)

may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, vehicular sensors, etc. and/or output device(s) 616 such as a display, speakers, printer, vehicular parts (e.g., wheels, transmission, etc.), etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer and/or vehicular computer) operating in a networked environment using logical connections to one or more remote computers. The remote computer may be a personal computer, a server, a router, a network PC, a peer device, a vehicular computer, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system comprising:
   at least one processor; and
   a memory coupled to the at least one processor, the memory comprising computer executable instructions that, when executed by the at least one processor, performs a method comprising:
      identifying at least one compression artifact within a set of multimedia features;
      determining a confidence threshold at least based on a scale of importance corresponding to the at least one compression artifact;
      generating a confidence value based on an evaluation of a first multimedia item using at least one machine learning model, wherein the confidence value indicates an extent to which a compression artifact is present within the first multimedia item; and
      comparing the confidence value to the confidence threshold.

2. The system of claim 1, wherein the first multimedia item is at least one of: a video clip, a broadcast media item, an Internet streaming media item, a frame, a set of frames, and an image.

3. The system of claim 1, wherein the set of multimedia features is comprised of at least one of: a visual feature and an audio feature.

4. The system of claim 3, wherein the visual feature is at least one of: an object, a pixel volume, a pixel placement, a color scheme, an environment layout, a shape outline, and an object placement.

5. The system of claim 1, wherein evaluating the first multimedia item using the at least one machine learning model comprises comparing first multimedia item to the at least one machine learning model using at least one of: a linear regression, a logistic regression, a linear discriminant analysis, a regression tree, a naïve Bayes algorithm, a k-nearest neighbors algorithm, a learning vector quantization, a neural network, a support vector machines (SVM), and a random forest algorithm.

6. The system of claim 1, further comprising:
training the at least one machine learning model to distinguish between compression artifacts and non-compression artifacts.

7. The system of claim 6, wherein the non-compression artifacts comprise at least one of: a rain fade artifact and a satellite-obstruction artifact.

8. The system of claim 1, further comprising:
based on a determination that the first multimedia item contains at least one compression artifact, determine at least one action response.

9. The system of claim 8, wherein the at least one action response comprises at least one of: increasing bandwidth availability, allocating at least one additional technical resource at the uplink, applying at least one smoothing algorithm to the first multimedia item, buffering, and transmitting a replacement multimedia item.

10. The system of claim 1, wherein the confidence threshold is a value set by a machine learning algorithm.

11. The system of claim 1, wherein generating the confidence value comprises generating a respective confidence value for each multimedia feature in the first multimedia item, and summing the respective confidence values to generate the confidence value.

12. A computer-implemented method for detecting and remediating compression artifacts comprising:
identifying at least one compression artifact within a set of multimedia features;
determining a confidence threshold at least based on a scale of importance corresponding to the at least one compression artifact;
generating a confidence value based on an evaluation of a first multimedia item using at least one machine learning model, wherein the confidence value indicates an extent to which a compression artifact is present within the first multimedia item; and
comparing the confidence value to the confidence threshold.

13. The method of claim 12, wherein the at least one machine learning model is trained using at least one of: a linear regression, a logistic regression, a linear discriminant analysis, a regression tree, a naïve Bayes algorithm, a k-nearest neighbors algorithm, a learning vector quantization, a neural network, a support vector machines (SVM), and a random forest algorithm.

14. The method of claim 12, wherein the at least one multimedia feature is at least one of: a frame, an image, a portion of a frame, a portion of an image, an object within a frame, and an object within an image.

15. The method of claim 12, wherein the at least one compression artifact is at least one of: a spatial artifact and a temporal artifact.

16. The method of claim 12, wherein the at least one machine learning model is trained to distinguish between compression artifacts and non-compression artifacts.

17. The method of claim 12, wherein the at least one remedial action is at least one of: increasing bandwidth, allocating at least one additional technical resource at the uplink, applying at least one smoothing algorithm to the first multimedia item, buffering, transmitting an alert message to at least one administrator, and transmitting a replacement multimedia item.

18. The method of claim 12, further comprising detecting at least one visual feature similarity between the multimedia feature and at least one previously identified compression artifact.

19. The method of claim 18, wherein the at least one previously identified compression artifact is stored in at least one database comprising a plurality of previously identified compression artifacts.

20. A non-transitory computer-readable media storing computer executable instructions that when executed cause a computing system to perform a method comprising:
identifying at least one compression artifact within a set of multimedia features;
determining a confidence threshold at least based on a scale of importance corresponding to the at least one compression artifact;
generating a confidence value based on an evaluation of a first multimedia item using at least one machine learning model, wherein the confidence value indicates an extent to which a compression artifact is present within the first multimedia item; and
comparing the confidence value to the confidence threshold.

* * * * *